United States Patent
Li et al.

(10) Patent No.: US 11,613,496 B2
(45) Date of Patent: Mar. 28, 2023

(54) REMOVAL OF SAND IMPURITIES IN WET PROCESSING

(71) Applicant: Halliburton Energy Services, Inc., Houston, TX (US)

(72) Inventors: Chunli Li, The Woodlands, TX (US); Leiming Li, Sugar Land, TX (US); Johnathan S. Hazlewood, Kingwood, TX (US); Liang Xu, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 21 days.

(21) Appl. No.: 17/331,254

(22) Filed: May 26, 2021

(65) Prior Publication Data
US 2022/0380246 A1    Dec. 1, 2022

(51) Int. Cl.
| | |
|---|---|
| C03C 1/02 | (2006.01) |
| B03B 7/00 | (2006.01) |
| B07B 11/06 | (2006.01) |
| B07B 11/02 | (2006.01) |
| B07B 4/08 | (2006.01) |

(52) U.S. Cl.
CPC .............. *C03C 1/022* (2013.01); *B03B 7/00* (2013.01); *B07B 4/08* (2013.01); *B07B 11/02* (2013.01); *B07B 11/06* (2013.01)

(58) Field of Classification Search
CPC .. C03C 1/022; B03B 7/00; B07B 4/08; B07B 11/02; B07B 11/06
USPC ........................................................ 423/340
See application file for complete search history.

(56) References Cited

U.S. PATENT DOCUMENTS

| | | | | | |
|---|---|---|---|---|---|
| 2,198,527 A | * | 4/1940 | Curtin | ................... | C03C 1/022 423/340 |
| 2,536,058 A | * | 1/1951 | Houston | ................ | C03C 1/022 209/167 |
| 2,583,280 A | * | 1/1952 | Herbert | ................... | C03C 1/022 423/340 |
| 2,769,540 A | * | 11/1956 | Brown | ................... | B03D 1/002 423/340 |
| 2,952,516 A | * | 9/1960 | Gross | ..................... | C03C 1/022 423/340 |
| 4,401,638 A | * | 8/1983 | Caballero | ............... | B03D 1/01 423/132 |

(Continued)

FOREIGN PATENT DOCUMENTS

| | | | |
|---|---|---|---|
| CZ | 279800 B6 | * | 6/1995 |
| WO | 2011033354 A1 | | 3/2011 |
| WO | 2013135643 A1 | | 9/2013 |

OTHER PUBLICATIONS

International Search Report and Written Opinion in PCT/US2021/036231, dated Feb. 25, 2022.

*Primary Examiner* — Gene O Crawford
*Assistant Examiner* — Muhammad Awais
(74) *Attorney, Agent, or Firm* — Barnes & Thornburg, LLP

(57) ABSTRACT

Methods and systems for treating mined sand to remove an impurity in accordance with the disclosure. An example method mined sand provides mined sand containing the impurity, contacting the mined sand with an aqueous treatment fluid comprising an ethoxylated alcohol and a sulfonic acid derivative, and drying the mined sand; wherein at least a portion of the impurity is removed from the dried mined sand after contact of the mined sand with the aqueous treatment fluid.

20 Claims, 1 Drawing Sheet

(56) References Cited

U.S. PATENT DOCUMENTS

| | | | | |
|---|---|---|---|---|
| 4,542,003 | A * | 9/1985 | Watkins | C03C 1/022 |
| | | | | 423/340 |
| 5,334,364 | A * | 8/1994 | Aguirre-Villafana | |
| | | | | C03C 1/022 |
| | | | | 423/340 |
| 7,101,524 | B2 * | 9/2006 | Small | C03C 1/022 |
| | | | | 423/340 |
| 9,108,233 | B2 * | 8/2015 | Lestan | B09C 1/02 |
| 9,357,768 | B2 * | 6/2016 | Fefer | A01N 39/04 |
| 10,272,443 | B2 * | 4/2019 | Ivanoff | B03B 11/00 |
| 2009/0090658 | A1 * | 4/2009 | Burkus | E21B 43/2408 |
| | | | | 208/390 |
| 2009/0139906 | A1 * | 6/2009 | Kruyer | B03B 9/02 |
| | | | | 210/167.01 |
| 2012/0199517 | A1 * | 8/2012 | Del Gaudio | C10G 1/04 |
| | | | | 977/902 |
| 2013/0274155 | A1 * | 10/2013 | Nasr-Ei-Din | C09K 8/54 |
| | | | | 507/241 |
| 2014/0116467 | A1 * | 5/2014 | McCosh | G21F 9/10 |
| | | | | 134/109 |
| 2015/0031594 | A1 * | 1/2015 | Wakhloo | C11D 1/94 |
| | | | | 510/365 |
| 2017/0291198 | A1 * | 10/2017 | Vallelly | B03D 1/02 |
| 2018/0093305 | A1 * | 4/2018 | Laffitte | B08B 3/02 |
| 2019/0329267 | A1 * | 10/2019 | McKeown | B07B 1/28 |

* cited by examiner

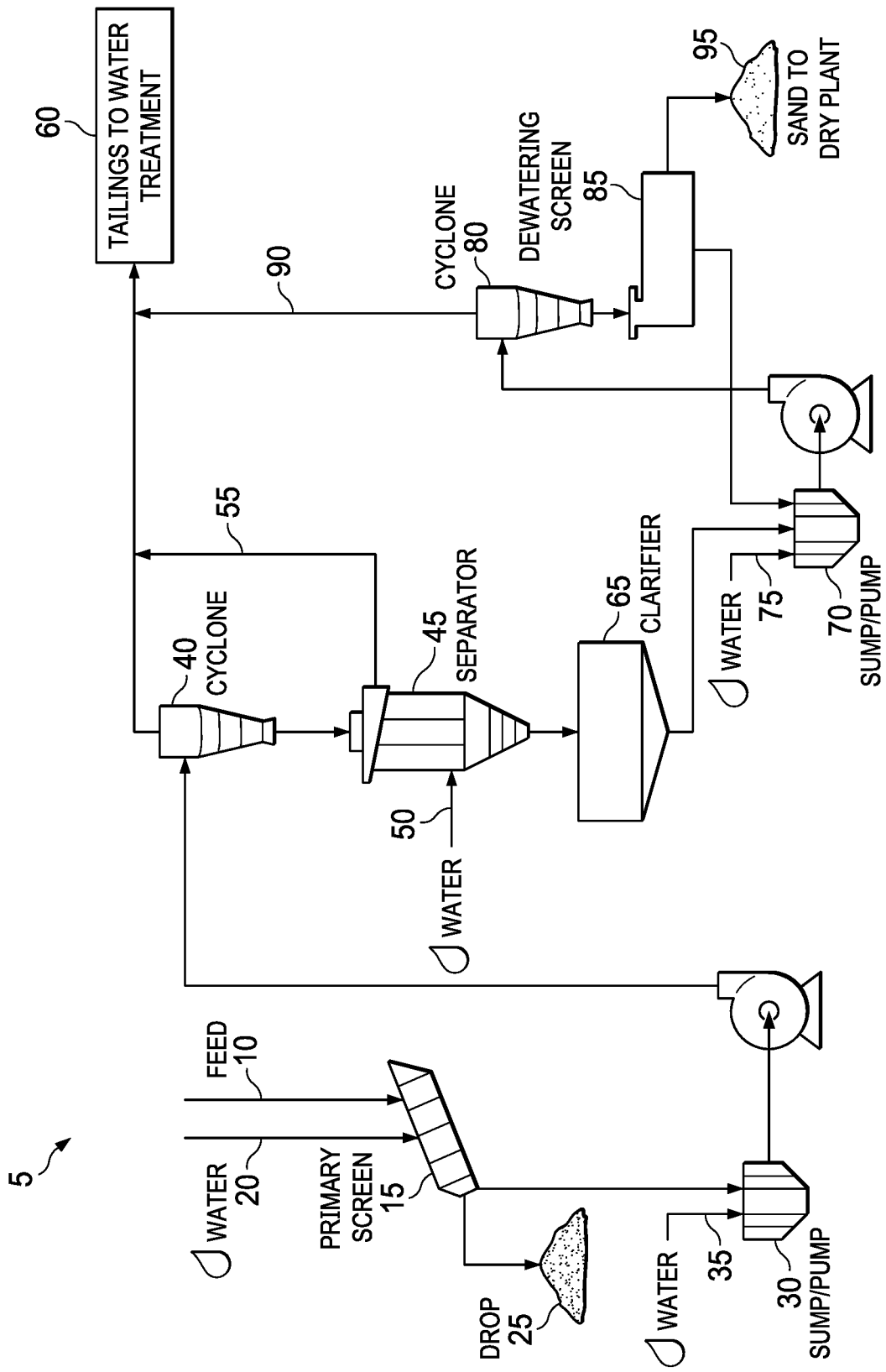

REMOVAL OF SAND IMPURITIES IN WET PROCESSING

TECHNICAL FIELD

The present disclosure relates generally to sand processing, and more particularly, to the use of ethoxylated alcohols and sulfonic acid derivatives to remove impurities from mined sand.

BACKGROUND

Sand mining is a necessary operation for the production of frac sand used in hydraulic fracturing operations. The sand used for frac sand comes from mined sandstone. Sandstone consists largely of quartz grains and may be held together by some natural cement or matrix material such as calcium carbonate, iron oxide, silica cement, clay, etc. In the frac sand mining process, sand is first mined from the ground. The mined sand is then transferred to a wet plant for wet processing. Utilizing a wash-water loop, the raw mined sand may be washed to remove silt, debris, and clay particles. The sand slurry may then be further processed through a series of screens and density separators. The sand is then conveyed to a wet stockpile where excess water is drained and recycled. Once the sand has settled, it is transported to a dry plant where it is dried and screened to final size. The final product may then be stored in silos for pickup and deployment.

During the mining process, certain impurities, such as inorganic materials, may enter the mined sand. These impurities may resist removal during the wet processing of the mined sand. If not sufficiently removed, these impurities may impact the quality of the processed sand product and prevent it from achieving a desired quality specification. The present disclosure provides improved methods and systems to remove impurities from mined sand.

BRIEF DESCRIPTION OF THE DRAWINGS

Illustrative examples of the present disclosure are described in detail below with reference to the attached drawing FIGURES, which are incorporated by reference herein, and wherein:

FIG. 1 illustrates a schematic of an example processing system for mined sand processing at a wet plant, in accordance with one or more examples described herein.

The illustrated FIGURES are only exemplary and are not intended to assert or imply any limitation with regard to the environment, architecture, design, or process in which different examples may be implemented.

DETAILED DESCRIPTION

The present disclosure relates generally to sand processing, and more particularly, to the use of ethoxylated alcohols and sulfonic acid derivatives to remove impurities from mined sand.

In the following detailed description of several illustrative examples, reference is made to the accompanying drawings that form a part hereof, and in which is shown by way of illustration, examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples is defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

As used herein, the term "formation" encompasses the term "reservoir," referring to a portion of the formation which has sufficient porosity and permeability to store or transmit fluids (e.g., hydrocarbons). As used herein, the term "fracturing fluid" refers generally to any fluid that may be used in a subterranean application in conjunction with a desired function and/or for a desired purpose. The term "fracturing fluid" does not imply any particular action by the fluid or any component thereof.

The present disclosure relates generally to sand processing, and more particularly, to the use of ethoxylated alcohols and sulfonic acid derivatives to remove impurities from mined sand. Mined sand may be obtained from any source including mined sandstone. The mined sand may be wet processed to obtain clean processed sand of a desired size. During the wet processing the mined sand may be contacted with an aqueous treatment fluid comprising an ethoxylated alcohol and a sulfonic acid derivative. The aqueous treatment fluid may remove impurities such as quartz, calcite, K-feldspar, plagioclase, and clay which may otherwise be difficult to remove during wet processing. Advantageously, treatment with the aqueous treatment fluid may produce sand having a desired turbidity. As a further advantage, treatment with the aqueous treatment fluid may allow for the successful wet processing of sand mined from low-grade areas of the mine which may contain higher concentrations of impurities. Another advantage is that the aqueous treatment fluid does not negatively impact sand quality. A still further advantage is that the aqueous treatment fluid may be added to the traditional wet processing equipment, such as the cyclone, screens, separators, and so forth, at the wet plant and does not require specialized equipment to be effective. Thus, the aqueous treatment fluids may be used efficiently without the need to alter or adjust normal wet processing operations.

The aqueous treatment fluids of the present disclosure comprise ethoxylated alcohols and sulfonic acid derivatives. The present materials were chosen based on their ability to hydrate inorganic impurities and improve their migration into the water phase of the aqueous treatment fluid. For example, the materials may work in tandem to hydrate clay, induce swelling, and increase migration of the clay into the aqueous treatment fluid where it may be removed from the mined sand when the aqueous treatment fluid is flushed or washed from the sand.

The ethoxylated alcohol comprises any ethoxylated alcohol sufficient for removing impurities from mined sand. Examples of the ethoxylated alcohol include, but are not limited to, nonyl phenol ethoxylate, dodecyl phenol ethoxylate, octyl phenol ethoxylate, tridecyl alcohol ethoxylate, oleyl alcohol ethoxylate, butanol ethoxylate, isodecyl alcohol ethoxylate, or any combination. With the benefit of this disclosure, one of ordinary skill in the art will be able to select an ethoxylated alcohol and formulate an aqueous treatment fluid for a desired application.

In some examples, the aqueous treatment fluid comprises an ethoxylated alcohol in a concentration of about 0.1 to about 10 gallons per thousand gallons (hereafter "gpt"). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the ethoxylated alcohol in the aqueous treatment fluid may range from about 0.1 gpt to about 10 gpt, from about 0.2 gpt to about 10 gpt, from about 0.3 gpt to about 10 gpt, from about 0.4 gpt to about 10 gpt, from about 0.5 gpt to about 10 gpt, from about 0.6 gpt to about 10 gpt, from about 0.7 gpt to about 10 gpt, from about 0.8 gpt to about 10 gpt, from about 0.9 gpt to about 10 gpt, from about 1 gpt to about 10 gpt, from about 2 gpt to about 10 gpt, from about 3 gpt to about 10 gpt, from about 4 gpt to about 10 gpt, from about 5 gpt to about 10 gpt, from about 6 gpt to about 10 gpt, from about 7 gpt to about 10 gpt, from about 8 gpt to about 10 gpt, or from about 9 gpt to about 10 gpt. Alternatively, the ethoxylated alcohol in the aqueous treatment fluid may range from about 0.1 gpt to about 10 gpt, from about 0.1 gpt to about 9 gpt, from about 0.1 gpt to about 8 gpt, from about 0.1 gpt to about 7 gpt, from about 0.1 gpt to about 6 gpt, from about 0.1 gpt to about 5 gpt, from about 0.1 gpt to about 4 gpt, from about 0.1 gpt to about 3 gpt, from about 0.1 gpt to about 2 gpt, from about 0.1 gpt to about 1 gpt, from about 0.1 gpt to about 0.9 gpt, from about 0.1 gpt to about 0.8 gpt, from about 0.1 gpt to about 0.7 gpt, from about 0.1 gpt to about 0.6 gpt, from about 0.1 gpt to about 0.5 gpt, from about 0.1 gpt to about 0.4 gpt, from about 0.1 gpt to about 0.3 gpt, or from about 0.1 gpt to about 0.2 gpt. With the benefit of this disclosure, one of ordinary skill in the art will be readily able to prepare an aqueous treatment fluid having a sufficient concentration of ethoxylated alcohol for a given application.

The sulfonic acid derivative comprises any sulfonic acid derivative sufficient for removing impurities from mined sand. Examples of the sulfonic acid derivative include, but are not limited to, diisopropyl naphthalene sulfonic acid, dodecylbenzene sulfonic acid, alkylaryl sulfonic acid, methyl naphthalene sulfonic acid, toluene sulfonic acid, sodium dodecylbenzene sulfonate, TEA-dodecylbenzene sulfonate, isopropylamine dodecylbenzene sulfonate, sodium C14-16 alpha olefin sulfonate, linear sodium alkylbenzene sulfonate, calcium slate of DDBSA, sodium xylene sulfonate, salts thereof, or any combination. With the benefit of this disclosure, one of ordinary skill in the art will be able to select a sulfonic acid derivative and formulate an aqueous treatment fluid for a desired application.

In some examples, the aqueous treatment fluid comprises an sulfonic acid derivative in a concentration of about 0.1 to about 10 gallons per thousand gallons (hereafter "gpt"). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the sulfonic acid derivative in the aqueous treatment fluid may range from about 0.1 gpt to about 10 gpt, from about 0.2 gpt to about 10 gpt, from about 0.3 gpt to about 10 gpt, from about 0.4 gpt to about 10 gpt, from about 0.5 gpt to about 10 gpt, from about 0.6 gpt to about 10 gpt, from about 0.7 gpt to about 10 gpt, from about 0.8 gpt to about 10 gpt, from about 0.9 gpt to about 10 gpt, from about 1 gpt to about 10 gpt, from about 2 gpt to about 10 gpt, from about 3 gpt to about 10 gpt, from about 4 gpt to about 10 gpt, from about 5 gpt to about 10 gpt, from about 6 gpt to about 10 gpt, from about 7 gpt to about 10 gpt, from about 8 gpt to about 10 gpt, or from about 9 gpt to about 10 gpt. Alternatively, the sulfonic acid derivative in the aqueous treatment fluid may range from about 0.1 gpt to about 10 gpt, from about 0.1 gpt to about 9 gpt, from about 0.1 gpt to about 8 gpt, from about 0.1 gpt to about 7 gpt, from about 0.1 gpt to about 6 gpt, from about 0.1 gpt to about 5 gpt, from about 0.1 gpt to about 4 gpt, from about 0.1 gpt to about 3 gpt, from about 0.1 gpt to about 2 gpt, from about 0.1 gpt to about 1 gpt, from about 0.1 gpt to about 0.9 gpt, from about 0.1 gpt to about 0.8 gpt, from about 0.1 gpt to about 0.7 gpt, from about 0.1 gpt to about 0.6 gpt, from about 0.1 gpt to about 0.5 gpt, from about 0.1 gpt to about 0.4 gpt, from about 0.1 gpt to about 0.3 gpt, or from about 0.1 gpt to about 0.2 gpt. With the benefit of this disclosure, one of ordinary skill in the art will be readily able to prepare an aqueous treatment fluid having a sufficient concentration of sulfonic acid derivative for a given application.

In some optional examples, the aqueous treatment fluid may further comprise an acid. The acid is an optional component and is not necessary for functionality in all examples. The acid comprises any acid sufficient for removing impurities from mined sand. Examples of the acid include, but are not limited to, hydrochloric acid, sulfuric acid, nitric acid, acetic acid, citric acid, phosphoric acid, or any combination. With the benefit of this disclosure, one of ordinary skill in the art will be able to select an acid and formulate an aqueous treatment fluid for a desired application.

In some optional examples, the aqueous treatment fluid comprises an acid in a concentration of about 0.1 to about 10 gallons per thousand gallons (hereafter "gpt"). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the acid in the aqueous treatment fluid may range from about 0.1 gpt to about 10 gpt, from about 0.2 gpt to about 10 gpt, from about 0.3 gpt to about 10 gpt, from about 0.4 gpt to about 10 gpt, from about 0.5 gpt to about 10 gpt, from about 0.6 gpt to about 10 gpt, from about 0.7 gpt to about 10 gpt, from about 0.8 gpt to about 10 gpt, from about 0.9 gpt to about 10 gpt, from about 1 gpt to about 10 gpt, from about 2 gpt to about 10 gpt, from about 3 gpt to about 10 gpt, from about 4 gpt to about 10 gpt, from about 5 gpt to about 10 gpt, from about 6 gpt to about 10 gpt, from about 7 gpt to about 10 gpt, from about 8 gpt to about 10 gpt, or from about 9 gpt to about 10 gpt. Alternatively, the acid in the aqueous treatment fluid may range from about 0.1 gpt to about 10 gpt, from about 0.1 gpt to about 9 gpt, from about 0.1 gpt to about 8 gpt, from about 0.1 gpt to about 7 gpt, from about 0.1 gpt to about 6 gpt, from about 0.1 gpt to about 5 gpt, from about 0.1 gpt to about 4 gpt, from about 0.1 gpt to about 3 gpt, from about 0.1 gpt to about 2 gpt, from about 0.1 gpt to about 1 gpt, from about 0.1 gpt to about 0.9 gpt, from about 0.1 gpt to about 0.8 gpt, from about 0.1 gpt to about 0.7 gpt, from about 0.1 gpt to about 0.6 gpt, from about 0.1 gpt to about 0.5 gpt, from about 0.1 gpt to about 0.4 gpt, from about 0.1 gpt to about 0.3 gpt, or from about 0.1 gpt to about 0.2 gpt. With the benefit of this disclosure, one of ordinary skill in the art will be readily able to prepare an aqueous treatment fluid having a sufficient concentration of acid for a given application.

The aqueous treatment fluid may be used to remove at least a portion of the impurities found in mined sand. Examples of these impurities include, but are not limited to, quartz, calcite, K-feldspar, plagioclase, clay, or any combination thereof. Without limitation, the aqueous treatment fluid may remove these impurities by improving migration of the impurities into the aqueous phase of the aqueous treatment fluid. In the example of clay, this may be performed by hydrating the clay, which may induce swelling and consequently improve migration.

The aqueous treatment fluids described herein comprise an aqueous base fluid. The aqueous base fluid may be from any source provided said source does not impede the functionality of the other treatment fluid components. Examples of the aqueous base fluid include, but are not limited to freshwater, brackish water, saline water, seawater, saturated saltwater, disposal water, recycled water, produced water, formation water, Ellenberger brines, the like, and any combinations thereof. One of ordinary skill in the art, with the benefit of this disclosure, should be readily able to select an aqueous base fluid for the preparation of the aqueous treatment fluid.

The present disclosure provides aqueous treatment fluids, methods, and systems for removing at least a portion of the impurities which may contaminate mined sand. The mined sand may be contacted with the aqueous treatment fluids during wet processing at a wet plant. After wet processing and the removal of the portion of impurities, the mined sand may be transferred to a dry plant for drying before storage and/or transport. The methods may include preparing one or more aqueous treatment fluids by adding ethoxylated alcohols, sulfonic acid derivatives, and/or an acid to an aqueous base fluid. The methods may include pumping one or more aqueous treatment fluids through the wet plant processing equipment. The methods may also include removing at least a portion of the aqueous treatment fluid from the wet plant processing equipment and the mined sand. In some examples, the systems described herein may further comprise a storage container for storage of the aqueous treatment fluid.

FIG. 1 illustrates a schematic of an example processing system 5 for mined sand processing at a wet plant, according to one or more examples. It should be noted that while FIG. 1 generally depicts mined sand processing at a wet plant, it is to be recognized that FIG. 1 is merely an example, and other components and/or processes may be used to process the mined sand. As depicted in FIG. 1, system 5 comprises a feed 10, which may be a conduit, conveyor belt, or other conveyance means which feeds raw mined sand to a screen 15. The screen 15 may represent a singular screen or may represent a multiple of screens comprising primary, secondary, tertiary screens, etc. An aqueous fluid 20 may be added to the raw mined sand as it is screened to assist in its passage. In some optional examples, the aqueous fluid 20 may be the aqueous treatment fluid described herein. The aqueous treatment fluid may be used to remove impurities from the mined sand as it is screened. Sand of the wrong size or other particulates 25 which are not screened may be dropped out of the screen 15 and removed.

The mined sand may then be passed to a pump 30. An aqueous fluid 35 may be added to the mined sand as it is pumped to assist in its passage. In some optional examples, the aqueous fluid 35 may be the aqueous treatment fluid described herein. The aqueous treatment fluid may be used to remove impurities from the mined sand as it is pumped to the cyclone 40. The cyclone 40, sometimes referred to as a hydrocyclone, may be used to separate the mined sand, and any other particulates present, by their relative densities (e.g., coarse particulates versus fine particulates). After exiting the cyclone 40, the mined sand may be passed to a separator 45 which may further separate the mined sand by size and/or density. An aqueous fluid 50 may be added to the mined sand as it is sorted in the separator 45. In some optional examples, the aqueous fluid 50 may be the aqueous treatment fluid described herein. The aqueous treatment fluid may be used to remove impurities from the mined sand as it is sorted in the separator 45. Any tailings 55 may be passed from the separator 45 to a water treatment facility 60.

After separation, the mined sand may be passed to a clarifier 65 where the aqueous fluid 50 and remaining mined sand may be clarified. The mined sand may then be passed to a second pump 70. An aqueous fluid 75 may be added to the mined sand as it is pumped to assist in its passage. In some optional examples, the aqueous fluid 75 may be the aqueous treatment fluid described herein. The aqueous treatment fluid may be used to remove impurities from the mined sand as it is pumped to a second cyclone 80. The second cyclone 80 may be used to separate the mined sand, and any other particulates present, by their relative densities (e.g., coarse particulates versus fine particulates). After exiting the second cyclone 80, the mined sand may be passed to a dewatering screen 85 for final size screening and dewatering. The tailings 90 from the second cyclone 80 may be conveyed to the water treatment facility 60. The mined sand 95 may then be collected and passed to a dry plant for further drying. In some further optional examples, the aqueous treatment fluid may be recycled and reused in the same system 5 if desired.

The aqueous treatment fluid may be added at any point in the system 5, including before or during treatment at the screen 15, before or during treatment at the pumps 30 and 70, before or during treatment at the cyclones 40 and 80, before or during treatment at the separator 45, before or during treatment at the clarifier 65, etc. It is to be understood that the aqueous treatment fluid may also be added to multiples of the processing equipment described above, and it is not limited to use at any one piece of plant equipment.

It is to be understood that system 5 is a schematic of one possible configuration of an example wet plant processing system. The individual pieces of wet plant processing equipment may be rearranged as would be readily apparent to one of ordinary skill in the art. In some examples, one or more pieces of wet plant processing equipment may be absent. In other examples, there may be additional pieces of wet plant processing equipment, for example, additional mixing tanks, pumps, cyclones, screens, separators, clarifiers, etc. As such, it is to be recognized that system 5 is merely exemplary in nature, and various additional configurations may be used that have not necessarily been depicted in FIG. 1 in the interest of clarity. Moreover, non-limiting additional components may be present, including, but not limited to, valves, condensers, adapters, joints, gauges, sensors, compressors, pressure controllers, pressure sensors, flow rate controllers, flow rate sensors, temperature sensors, and the like.

It should be clearly understood that the example illustrated by FIG. 1 is merely a general application of the principles of this disclosure in practice, and a wide variety of other examples are possible. Therefore, the scope of this disclosure is not limited in any manner to the details of FIG. 1 as described herein.

It is also to be recognized that the disclosed methods and systems may also directly or indirectly affect the various downhole equipment and tools that may contact the aqueous treatment fluids and systems disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIG. 1.

EXAMPLES

The present disclosure may be better understood by reference to the following examples, which are offered by way of illustration. The present disclosure is not limited to the examples provided herein.

Example 1

Turbidity tests were performed to evaluate the performance of several aqueous treatment fluids. Caliche samples containing quartz, calcite, K-feldspar, plagioclase, and clay impurities were treated with various aqueous treatment fluids to determine the migration tendencies of the samples. In Table 2 below, all caliche samples were sieved through 30/40 sieves. An aqueous treatment fluid sample was made by adding predetermined concentrations of ethoxylated alcohols and sulfonic acid derivatives (e.g., a mixture of a C12-C13 oxo alcohol and amine salts of linear alkylbenzene sulfonic acid) to pond water and mixing. 15 mL of the aqueous treatment fluid was then added to glass vials followed by 0.25 g of the sieved mine samples. Similar surfactant compositions were made to compare. These compositions were clay stabilizers used to stabilize clay formations by preventing swelling and degradation of clay formations when contacted with water.

TABLE 2

Turbidity test results of various aqueous treatment fluids on caliche samples.

| Sample # | Ethoxylated Alcohol | Sulfonic Acid Derivative | Dosage | Turbidity at 2 Hours | % Increase |
|---|---|---|---|---|---|
| 1 (Pond water Control) | — | — | — | 182 | — |
| 2 (Treatment fluid example) | C12-C13 oxo alcohol | Amine salts of linear alkylbenzene sulfonic acid | 2 gpt | 461 | 253% |
| 3 (Clay stabilizer composition comparative) | — | — | 2 gpt | 207 | 114% |
| 4 (Clay stabilizer composition comparative) | — | — | 2 gpt | 126 | 69% |
| 5 (Clay stabilizer composition comparative) | — | — | 2 gpt | 145 | 80% |
| 6 (Clay stabilizer composition comparative) | — | — | 2 gpt | 208 | 114% |
| 7 (Clay stabilizer composition comparative) | — | — | 2 gpt | 363 | 199% |

As shown, sample 2 performed the best with a 253% increase in turbidity, indicating that a significant portion of the impurities had migrated to the water phase. Moreover, sample 2 shows that it does not stabilize clay formations, but induces migration into the water phase by showing increased turbidity over the control.

An additional turbidity test was performed utilizing sample 2 above, and comparing it with two new samples of clay stabilizers. The dosage of the aqueous treatment fluids were varied in this test. The aqueous treatment fluids and caliche samples were prepared the same.

TABLE 3

Turbidity test results of various aqueous treatment fluids on caliche samples.

| Sample # | Ethoxylated Alcohol | Sulfonic Acid Derivative | Dosage | Turbidity at 2 Hours | % Increase |
|---|---|---|---|---|---|
| 1 (Pond Water Control) | — | — | — | 242 | — |
| 2 (Treatment fluid example) | C12-C13 oxo alcohol | Amine salts of linear alkylbenzene sulfonic acid | 1 gpt | 473 | 195% |
| 2 (Treatment fluid example) | C12-C13 oxo alcohol | Amine salts of linear alkylbenzene sulfonic acid | 2 gpt | 505 | 209% |
| 8 (Clay stabilizer composition comparative) | — | — | 1 gpt | 314 | 130% |
| 8 (Clay stabilizer composition comparative) | — | — | 2 gpt | 134 | 55% |
| 9 (Clay stabilizer composition comparative) | — | — | 1 gpt | 256 | 106% |
| 9 (Clay stabilizer composition comparative) | — | — | 2 gpt | 111 | 46% |

The results of the experiment represented by Table 3 continue to indicate that sample 2 induces increased migration of the impurities into the aqueous phase.

Another turbidity test was performed but with a different treatment of the mined samples. The caliche samples were sieved with 30/40 mesh and then washed with the aqueous treatment fluids. The mine samples and the aqueous treatment fluid were prepared in the same manner as described above. After washing, the mine samples were dried before being added to pond water to have the turbidity measured. In this test, the lower turbidity indicates better wet processing of the mine samples because they have been washed prior to measuring. Additionally, a volume of acid was added to each sample to test whether acid could improve the ability to remove impurities. For 0.25 g sieved mine samples, 1.825 gram of 10% HCl solution were added to each sample. This amount was calculated based on the equal mole of calcite content (48%) in the caliche sample.

TABLE 4

Turbidity test results of various aqueous treatment fluids on caliche samples.

| Sample # | Ethoxylated Alcohol | Sulfonic Acid Derivative | Dosage | Turbidity at 2 Hours | % Decrease |
|---|---|---|---|---|---|
| 1 (Pond Water Control) | — | — | — | 72.7 | — |
| 2 (Treatment fluid example) | C12-C13 oxo alcohol | Amine salts of linear alkylbenzene sulfonic acid | 2 gpt | 56.5 | 78% |
| 8 (Clay stabilizer composition comparative) | — | — | 2 gpt | 68.6 | 94% |
| 9 (Clay stabilizer composition comparative) | — | — | 2 gpt | 73.2 | 101% |
| 1 + HCl | — | — | — | 56.9 | 78% |
| 2 + HCl | C12-C13 oxo alcohol | Amine salts of linear alkylbenzene sulfonic acid | 2 gpt | 61.4 | 84% |
| 8 + HCl | — | — | 2 gpt | 49.5 | 68% |
| 9 + HCl | — | — | 2 gpt | 44.0 | 61% |

The results of the experiment represented by Table 3 continue to indicate that sample 2 (the aqueous treatment fluid) provided the best impurity removal.

Provided are methods for treating mined sand to remove an impurity in accordance with the disclosure. An example method comprises providing mined sand containing the impurity, contacting the mined sand with an aqueous treatment fluid comprising an ethoxylated alcohol and a sulfonic acid derivative, and drying the mined sand; wherein at least a portion of the impurity is removed from the dried mined sand after contact of the mined sand with the aqueous treatment fluid.

Additionally or alternatively, the method may include one or more of the following features individually or in combination. The ethoxylated alcohol may comprise an ethoxylated alcohol selected from the group consisting of nonyl phenol ethoxylate, dodecyl phenol ethoxylate, octyl phenol ethoxylate, tridecyl alcohol ethoxylate, oleyl alcohol ethoxylate, butanol ethoxylate, isodecyl alcohol ethoxylate, and any combination thereof. The ethoxylated alcohol may be present in the aqueous treatment fluid in a concentration of about 0.1 to about 10 gpt. The sulfonic acid derivative may comprise a sulfonic acid derivative selected from the group consisting of diisopropyl naphthalene sulfonic acid, dodecylbenzene sulfonic acid, alkylaryl sulfonic acid, methyl naphthalene sulfonic acid, toluene sulfonic acid, sodium dodecylbenzene sulfonate, TEA-dodecylbenzene sulfonate, isopropylamine dodecylbenzene sulfonate, sodium C14-16 alpha olefin sulfonate, linear sodium alkylbenzene sulfonate, calcium slate of DDBSA, sodium xylene sulfonate, slats thereof, and any combination thereof. The sulfonic acid derivative may be present in the aqueous treatment fluid in a concentration of about 0.1 to about 10 gpt. The aqueous treatment fluid may further comprise an acid. The acid may be present in the aqueous treatment fluid in a concentration of about 0.1 to about 10 gpt. The acid may further comprise an acid selected from the group consisting of hydrochloric acid, sulfuric acid, nitric acid, acetic acid, citric acid, phosphoric acid, and any combination thereof. The impurity may be an impurity selected from the group consisting of quartz, calcite, K-feldspar, plagioclase, clay, and any combination thereof. The method may further comprise treating the mined sand prior to or during the passing of the mined sand through a cyclone. The method may further comprise treating the mined sand prior to or during the passing of the mined sand through a screen. The method may further comprise treating the mined sand prior to or during the passing of the mined sand through a pump. The method may further comprise treating the mined sand prior to or during the passing of the mined sand through a separator.

Provided are systems for treating mined sand to remove an impurity in accordance with the disclosure. An example system comprises mined sand containing the impurity, an aqueous treatment fluid comprising an ethoxylated alcohol and a sulfonic acid derivative, and a pump for pumping the mined sand.

Additionally or alternatively, the system may include one or more of the following features individually or in combination. The ethoxylated alcohol may comprise an ethoxylated alcohol selected from the group consisting of nonyl phenol ethoxylate, dodecyl phenol ethoxylate, octyl phenol ethoxylate, tridecyl alcohol ethoxylate, oleyl alcohol ethoxylate, butanol ethoxylate, isodecyl alcohol ethoxylate, and any combination thereof. The ethoxylated alcohol may be present in the aqueous treatment fluid in a concentration of about 0.1 to about 10 gpt. The sulfonic acid derivative may comprise a sulfonic acid derivative selected from the group consisting of diisopropyl naphthalene sulfonic acid, dodecylbenzene sulfonic acid, alkylaryl sulfonic acid, methyl naphthalene sulfonic acid, toluene sulfonic acid, sodium dodecylbenzene sulfonate, TEA-dodecylbenzene sulfonate, isopropylamine dodecylbenzene sulfonate, sodium C14-16 alpha olefin sulfonate, linear sodium alkylbenzene sulfonate, calcium slate of DDBSA, sodium xylene sulfonate, slats thereof, and any combination thereof. The sulfonic acid derivative may be present in the aqueous treatment fluid in a concentration of about 0.1 to about 10 gpt. The aqueous treatment fluid may further comprise an acid. The acid may be present in the aqueous treatment fluid in a concentration of about 0.1 to about 10 gpt. The acid may further comprise an acid selected from the group consisting of hydrochloric acid, sulfuric acid, nitric acid, acetic acid, citric acid, phosphoric acid, and any combination thereof. The impurity may be an impurity selected from the group consisting of quartz, calcite, K-feldspar, plagioclase, clay, and any combination thereof. The system may further comprise a cyclone, wherein the mined sand is treated prior to or during the passing of the mined sand through cyclone. The system may further comprise a screen, wherein the mined sand is treated prior to or during the passing of the mined sand through the screen. The system may further comprise a pump, wherein the mined sand is treated prior to or during the passing of the mined sand through the pump. The system may further comprise a separator, wherein the mined sand is treated prior to or during the passing of the mined sand through the separator.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating mined sand to remove an impurity, the method comprising:
   providing mined sand containing the impurity,
   contacting the mined sand with an aqueous treatment fluid comprising an ethoxylated alcohol and a sulfonic acid derivative whereby the contacting the mined sand with the aqueous treatment fluid removes at least a portion of the impurity contained in the mined sand, and
   drying the mined sand after contacting the mined sand with the aqueous treatment fluid.

2. The method of claim 1, wherein the ethoxylated alcohol comprises an ethoxylated alcohol selected from the group consisting of nonyl phenol ethoxylate, dodecyl phenol ethoxylate, octyl phenol ethoxylate, tridecyl alcohol ethoxylate, oleyl alcohol ethoxylate, butanol ethoxylate, isodecyl alcohol ethoxylate, and any combination thereof.

3. The method of claim 1, wherein the ethoxylated alcohol is present in the aqueous treatment fluid in a concentration of about 0.1 to about 10 gpt.

4. The method of claim 1, wherein the sulfonic acid derivative comprises a sulfonic acid derivative selected from the group consisting of diisopropyl naphthalene sulfonic acid, dodecylbenzene sulfonic acid, alkylaryl sulfonic acid, methyl naphthalene sulfonic acid, toluene sulfonic acid, sodium dodecylbenzene sulfonate, TEA-dodecylbenzene sulfonate, isopropylamine dodecylbenzene sulfonate, sodium C14-16 alpha olefin sulfonate, linear sodium alkylbenzene sulfonate, calcium slate of DDBSA, sodium xylene sulfonate, slats thereof, and any combination thereof.

5. The method of claim 1, wherein the sulfonic acid derivative is present in the aqueous treatment fluid in a concentration of about 0.1 to about 10 gpt.

6. The method of claim 1, wherein the aqueous treatment fluid further comprises an acid.

7. The method of claim 6, wherein the acid is present in the aqueous treatment fluid in a concentration of about 0.1 to about 10 gpt.

8. The method of claim 6, wherein the acid further comprises an acid selected from the group consisting of hydrochloric acid, sulfuric acid, nitric acid, acetic acid, citric acid, phosphoric acid, and any combination thereof.

9. The method of claim 1, wherein the impurity is an impurity selected from the group consisting of quartz, calcite, K-feldspar, plagioclase, clay, and any combination thereof.

10. The method of claim 1, further comprising treating the mined sand prior to or during the passing of the mined sand through a cyclone.

11. The method of claim 1, further comprising treating the mined sand prior to or during the passing of the mined sand through a screen.

12. The method of claim 1, further comprising treating the mined sand prior to or during the passing of the mined sand through a pump.

13. The method of claim 1, further comprising treating the mined sand prior to or during the passing of the mined sand through a separator.

14. A system for treating mined sand to remove an impurity, the system comprising:
   mined sand containing the impurity,
   an aqueous treatment fluid comprising an ethoxylated alcohol and a sulfonic acid derivative, wherein the aqueous treatment fluid is configured to contact the mined sand with the impurity and after this contact, a portion of the impurity contained in the mined sand is removed from the mined sand; and
   a pump for pumping the mined sand.

15. The system of claim 14, wherein the ethoxylated alcohol comprises an ethoxylated alcohol selected from the group consisting of nonyl phenol ethoxylate, dodecyl phenol ethoxylate, octyl phenol ethoxylate, tridecyl alcohol ethoxylate, oleyl alcohol ethoxylate, butanol ethoxylate, isodecyl alcohol ethoxylate, and any combination thereof.

16. The system of claim 14, wherein the sulfonic acid derivative comprises a sulfonic acid derivative selected from the group consisting of diisopropyl naphthalene sulfonic acid, dodecylbenzene sulfonic acid, alkylaryl sulfonic acid, methyl naphthalene sulfonic acid, toluene sulfonic acid, sodium dodecylbenzene sulfonate, TEA-dodecylbenzene sulfonate, isopropylamine dodecylbenzene sulfonate, sodium C14-16 alpha olefin sulfonate, linear sodium alkylbenzene sulfonate, calcium slate of DDBSA, sodium xylene sulfonate, salts thereof, and any combination thereof.

17. The system of claim 14, wherein the aqueous treatment fluid further comprises an acid selected from the group consisting of hydrochloric acid, sulfuric acid, nitric acid, acetic acid, citric acid, phosphoric acid, and any combination thereof.

18. The system of claim 14, wherein the impurity is an impurity selected from the group consisting of quartz, calcite, K-feldspar, plagioclase, clay, and any combination thereof.

19. The system of claim 14, further comprising a cyclone and wherein the mined sand is treated prior to or during the passing of the mined sand through the cyclone.

20. The system of claim 14, further comprising a screen and wherein the mined sand is treating prior to or during the passing of the mined sand through the screen.

* * * * *